United States Patent [19]

Rhodes

[11] Patent Number: 4,686,938
[45] Date of Patent: Aug. 18, 1987

[54] SYSTEM FOR HEATING LIQUID IN A SEPARATOR

[75] Inventor: James E. Rhodes, Farmington, N. Mex.

[73] Assignee: Process Equipment & Service Co., Inc., Farmington, N. Mex.

[21] Appl. No.: 917,970

[22] Filed: Sep. 26, 1986

[51] Int. Cl.[4] ................................................. B09B 3/00
[52] U.S. Cl. ...................................... 122/4 R; 55/20; 55/32; 122/1 R
[58] Field of Search ....................... 122/1 R, 4 R, 488; 55/32, 20

[56] References Cited

U.S. PATENT DOCUMENTS

| 3,397,731 | 8/1968 | Gravis, III et al. | 55/32 X |
| 3,450,603 | 6/1969 | Meyers et al. | 55/32 X |
| 3,616,598 | 11/1971 | Foral, Jr. | 55/32 |
| 4,421,062 | 12/1983 | Padilla, Sr. | 122/1 R |
| 4,511,374 | 4/1985 | Heath | 55/32 X |

Primary Examiner—Edward G. Favors
Attorney, Agent, or Firm—Head Johnson Stevenson

[57] ABSTRACT

A method, and a system for practicing the method, of heating liquid in a separator utilizing heat from a glycol regenerator. The system employs a gas pressure operated pump for pumping heat exchange fluid through a closed loop flow path. A gas burner in the regenerator vessel has a pilot light. Piping connects combustible gas to the burner and to the gas pressure operated pump and from the gas pressure operated pump to the pilot light. A thermostatically controlled valve is positioned in the heat exchange closed loop fluid flow path and opens and closes in response to the temperature of the liquid in the separator vessel, the valve opening to permit flow of heat exchange fluid in response to a detected low liquid temperature. Flow of gas through the pump remaining substantially constant at all times and providing a fuel source for the continuous operation of the pilot light.

13 Claims, 4 Drawing Figures

SYSTEM FOR HEATING LIQUID IN A SEPARATOR

SUMMARY OF THE INVENTION

The present invention relates to the use of heat available from a dehydrator to heat liquid in a separator. In most areas where dehydrators are common, natural gas is the primary product and liquid hydrocarbons are a secondary product. Natural gas is transported in a pipeline and liquid hydrocarbons are trucked to a refinery. The natural gas is dehydrated so that no water will condense out in the pipeline. Free water can mix with natural gas, under certain conditions, and produce hydrates. These hydrates plug the pipeline and interrupt the flow of gas. In addition, gas which emanates from subterranean formations usually contains entrained water. It is common in the operation of gas production facilities to provide dehydrators for extracting entrained water from natural gas.

To prevent free liquid from being carried with the gas into a glycol absorber, a separator is typically used. Free liquid in the glycol absorber, either water or oil, usually causes substantial glycol losses. A primary function of the present invention is to provide an improved method, and an improved system for practicing the method, of keeping the separator operable by preventing separated water from freezing.

In brief summary, a typical dehydrator utilized in the petroleum industry uses a desiccant, such as glycol, through which wet gas is passed. Dry glycol will absorb the water from the gas, the gas passing out of the glycol being thereafter relatively free of water. To continuously recycle the glycol, it must be heated above a minimum temperature in a glycol regenerator to evaporate the water therefrom and to thereby dehydrate the glycol.

An object of the present invention is to use heat from a glycol regenerator to heat the production liquid in a separator vessel.

The concept of using heat from a regenerator for heating liquid in a separator is well known such as revealed in U.S. Pat. No. 3,318,071 to Sinex. Another more recent patent which discloses this system is U.S. Pat. No. 4,421,062 issued to Padilla. The systems revealed in these patents work successfully except that each has limitations and disadvantages. It is an object of the present invention to overcome the limitations of the prior art, exemplified by these two United States patents.

The present invention provides a system for heating liquid in a separator which is positioned in proximity to a glycol regenerator. A closed fluid flow loop is provided within the separator vessel and within the regenerator vessel, the closed fluid flow loop having a heat transfer fluid therein. The regenerator vessel has a gas fired burner to heat the desiccant therein, the burner having a pilot light. A fluid flow eductor pump is positioned in series with the closed heat transfer system. Gas from a pressurized source is fed through the eductor which applies circulating energy to the heat transfer fluid tending to cause it to circulate between the regenerator vessel and the separator vessel. The gas from the eductor pump is fed to the burner pilot light.

A self-actuating thermostatically controlled valve is placed in the closed loop heat exchange system and is operated in response to the temperature of the liquid in the separator vessel. When the temperature drops below a preselected level, the thermostatic valve is opened, allowing fluid to circulate in the closed loop system, exchanging heat from the regenerator vessel to the liquid within the separator vessel.

The system of this invention offers advantages over previous systems in that the gas flow through the eductor pump remains substantially constant at all times and is utilized to operate the pilot light of the burner of the regenerator vessel. This gas flow to the pilot light is at a uniform rate even though the burner may be turned ON and OFF in response to the temperature of the desiccant and the circulation of heat conducting fluid between the regenerator vessel and the separator vessel is intermittant in response to the needs of the regenerator vessel.

A better understanding of the invention will be held by reference to the following description and claims, taken in conjunction with the attached specification.

DESCRIPTION OF THE PREFERRED EMBODIMENT

Figure 1:
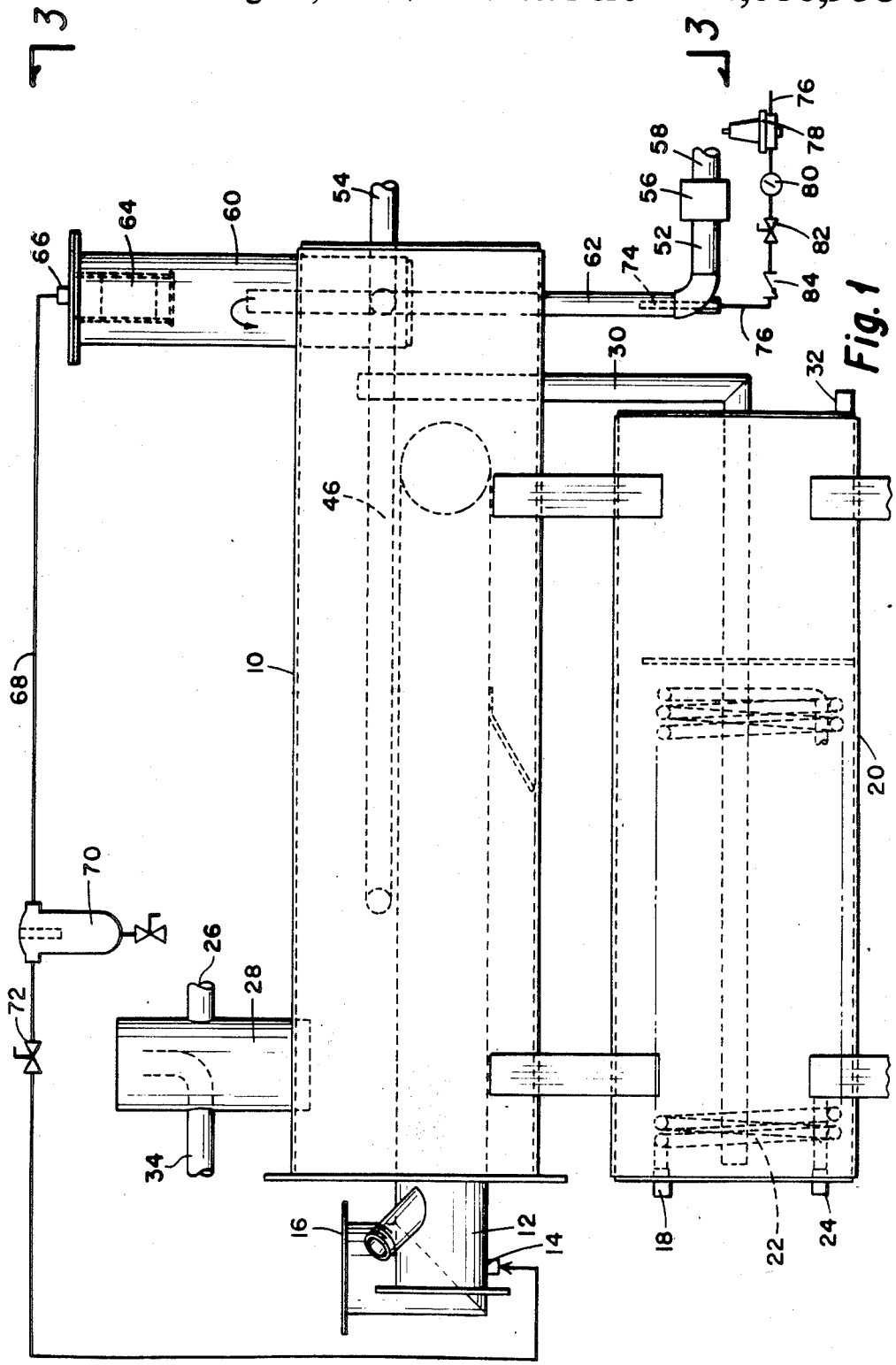
FIG. 1 is an elevational view of a regenerator vessel which is adapted to employ the principles of this invention.

Referring to FIG. 1, a regenerator vessel is indicated by the numeral 10. The vessel includes a burner 12 by which a desiccant, such as glycol, may be heated to drive water therefrom. Burner 12 has a pilot light indicated by a gas inlet 14. An exhaust stack is typically attached to flange 16, the exhaust stack not being shown. The vessel 10 and burner 12 are shown diagrammatically and the actual appearance of these items may vary considerably but they are commonly employed in the petroleum industry, and are familiar to technicians in the art, and therefore it is not important to the essence of this invention to illustrate these components in greater detail than is shown.

The purpose of the regenerator vessel 10 is to extract water from a desiccant emanating from an absorber, the absorber not being shown. Wet desiccant, usually glycol, flows from the absorber, through an inlet 18 in a storage vessel 20 and through a heat exchange coil 22 and out through outlet 24. In some applications, especially small units, such glycol/glycol heat exchangers are not employed and other types of heat exchange are employed. The illustrated system of heat exchange is merely exemplary. The wet glycol then flows by piping (not shown) from outlet 24 to wet glycol inlet 26 formed in a column 28 extending upwardly from vessel 10. The glycol flows through the interior of vessel 10 wherein entrained water is driven out, and the glycol, free of water flows out through overflow pipe 30 to the interior of the storage vessel 20. Dry glycol outlet 32 then communicates back to a glycol absorber (not shown). In this way the glycol is regenerated and recirculated. The details of the extraction of water from the glycol within the regenerator vessel 10 are not illustrated as they are not important to the present invention. The operation of glycol regenerators is well known. Steam, and other gas driven from the heated glycol passes upwardly in column 28 and out through water vapor 34. It is apparent that the heated glycol within the regenerator vessel 10 offers a heat source.

Figure 2:
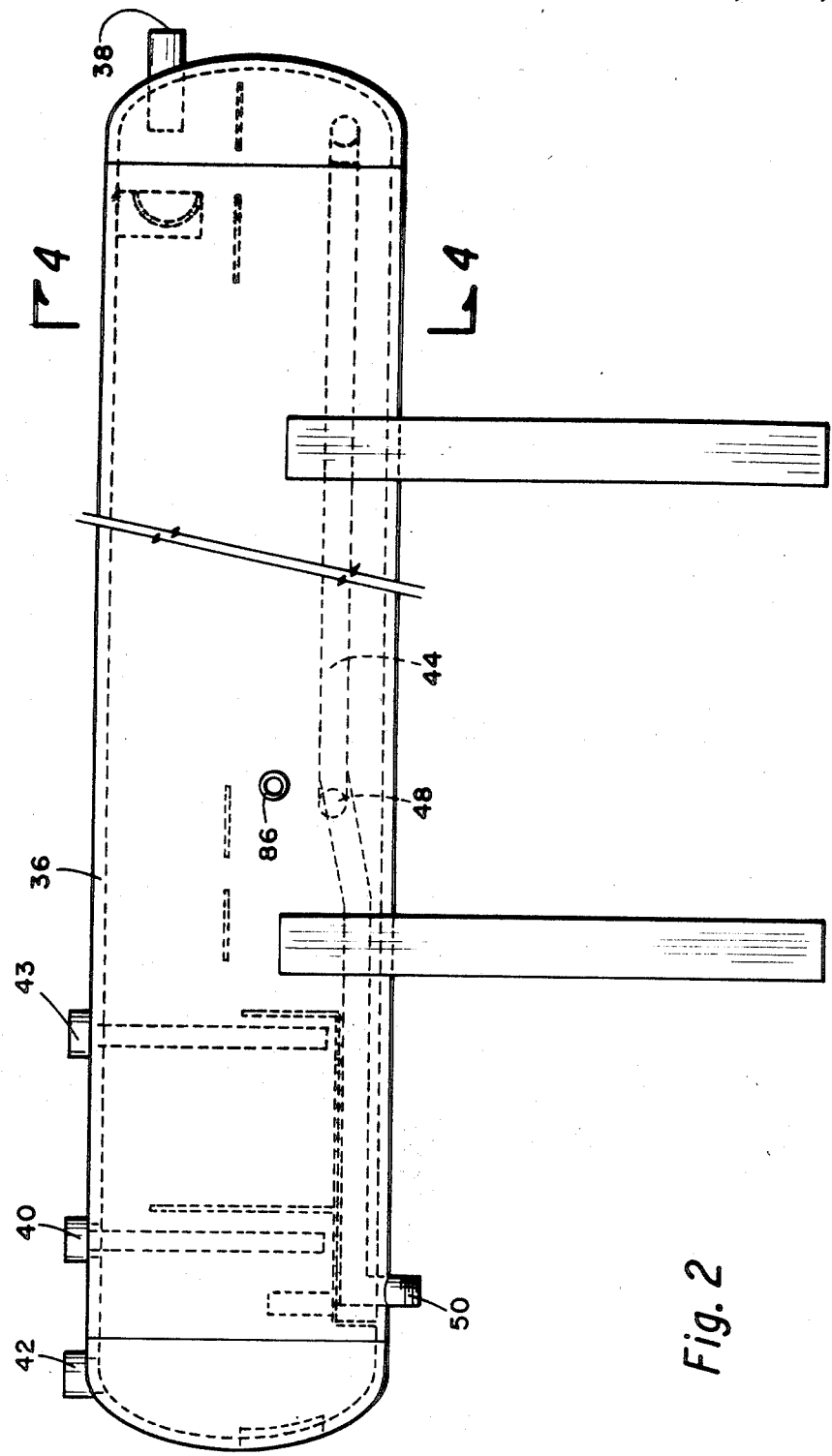
FIG. 2 is an elevational view of a separator vessel having equipment for receiving heat exchange with the regenerator vessel of FIG. 1.

FIG. 2 is an elevational view of a separator vessel which is used adjacent to the regenerator vessel 10 of FIG. 1. Separator vessel 36 receives the flow of production fluid which usually is gas, but in some instances may include liquid hydrocarbons, water, or a mixture of the two, through inlet 38. Within the separator 36 water is permitted to settle out and flows out through outlet 40. Liquid hydrocarbons that are separated flow out through outlet 43. Gas which is separated passes out of the vessel through gas outlet 42. The details of operation of the separator vessel 36 are unimportant to the present invention. Generally speaking the vessel 36 offers an environment for liquid to settle from produced gas. It is important that the water be prevented from freezing during cold weather, and that mixtures be kept warm in order to improve separation.

The present invention provides an automatic system for utilizing heat from the heated desiccant within regenerator vessel 10 to heat the liquid in separator vessel 36. For this purpose a closed fluid flow loop 44 is provided in separator vessel 36 and, in like manner, a closed fluid flow loop 46 is provided in regenerator vessel 10. The closed loop 44 has a fluid inlet 48 and a fluid outlet 50. These inlets and outlets can be arranged in many other ways and the particular configuration of the closed loops 44 and 46 can be changed and are not significant as to the invention. The heat exchange fluid inlet for regenerator vessel 10 is at 52 and the heat exchange fluid outlet for vessel 10 is at 54. In series with the exchange fluid inlet 52 is a thermostatically controlled valve 56 connected with a pipe 58. Pipe 58 connects to the fluid outlet 50 and pipe 54 connects to the fluid inlet 48, thus forming a closed heat exchange loop.

Figure 3:
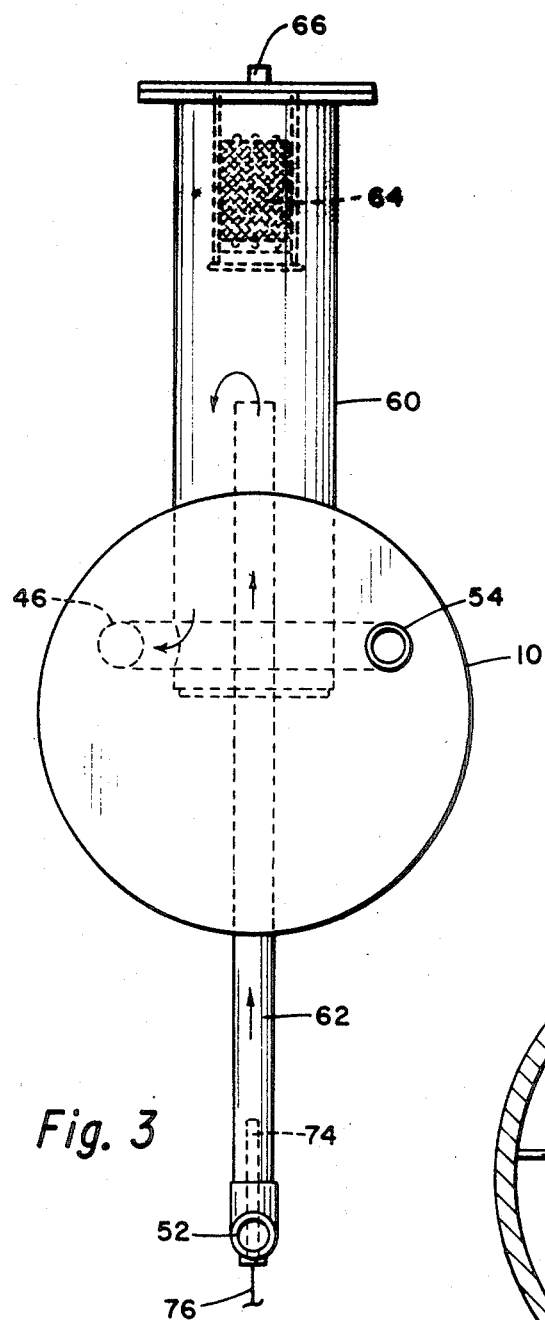
FIG. 3 is an elevational view taken along the line 3—3 of FIG. 1 but wherein the storage vessel portion of FIG. 1 is not illustrated.
Figure 4:
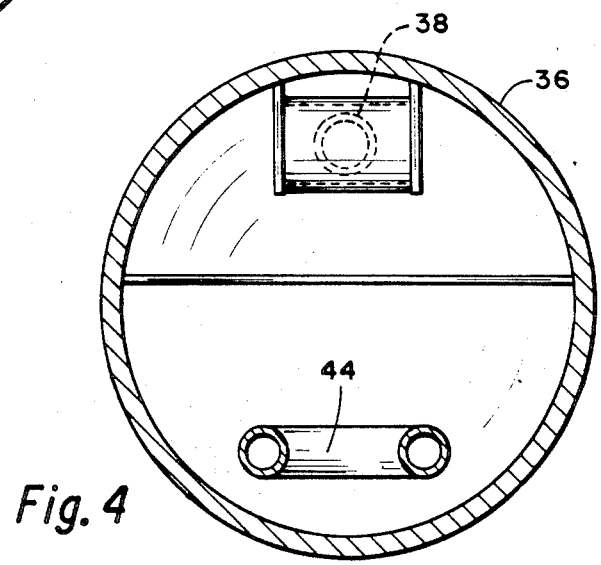
FIG. 4 is a cross-sectional view taken along the line 4—4 of FIG. 2.

Forming a part of the closed heat exchange loop is an upright volume tank 60 which is shown attached to the vessel 10, however, the interior of the volume tank 60 does not communicate with the interior of vessel 10. FIG. 3 shows how the interior of volume tank 60 is connected to the closed fluid flow loop 46. The heat exchange fluid inlet 52 connects with an upright riser pipe 62 which extends through vessel 10 and sealably through the bottom of the volume tank 60. The open end thereof terminates within the volume tank intermediate the top and bottom of it.

Within the volume tank 60 is a mist extractor 64 and in the top of the volume tank is a gas outlet 66. As shown in FIG. 1, the gas outlet 66 is connected through an accumulator 70 and valve 72 to the pilot light 14.

Positioned within the lower end of the riser pipe 62 is a reduced diameter eductor pipe 74 which is formed of an external diameter smaller than the internal diameter of the riser pipe 62. A source of combustible gas under pressure is connected to pipe 76. The gas flows through a regulator 78, pressure indicator 80, shut-off valve 82 and check valve 84 to the eductor pipe 74.

The physical apparatus for practicing the method and system of this invention are, in some instances, illustrated diagrammatically, but well within keeping of the skill of practitioners in the art.

Operation of the System and Method

Gas flows from the source connected to pipe 76 through eductor pipe 74 into the interior of the riser pipe 62. The gas bubbles upwardly within the heat transfer fluid in the closed system and into volume tank 60. If thermostat valve 56 is closed, no fluid flow takes place, however, the gas flows uninterruptedly out through the mist extractor 64 and piping 68 to the pilot light 14. Thus, gas is supplied continuously and at a substantially constant volume to the pilot light. Thermostatically controlled valve 56 is of the self-actuating type. A sensing bulb and its protecting well is placed in separator vessel 36. This bulb is full of a fluid that has a high coefficient of thermal expansion. The bulb is connected to valve 56 by a small capillary tube (not shown). The force of thermal expansion or contraction of the fluid opens or closes valve 56. Thus, no gas is wasted as when using a conventional thermostat-motor valve arrangement and no source of electrical energy is required as when using an electrically actuated thermostatic valve. When the thermostat bulb 86 in separator vessel 36 senses the need for heat, valve 56 is opened. When valve 56 opens, gas flowing upwardly through the riser pipe 62 causes heat transfer fluid to flow up through the riser pipe 62. From thence the heat transfer fluid flows through the closed fluid flow loop 46, out through the outlet 54 to the inlet 48 of vessel 36. The fluid flows through the flow loop 44 in the vessel 36, out outlet 50 and back to pipe 58. Thus, as long as valve 56 is opened gas flowing to the pilot light causes the fluid to be circulated in the closed system, transferring heat to the liquid within the separator vessel 36. When thermostat 86 detects a temperature indicating that liquid has reached a preselected desirable level, valve 56 is closed. The fluid flow through the heat transfer system stops. However, the gas flow to the pilot light continues uninterruptedly.

Thus, a system is provided which is substantially trouble free. It provides a continuous substantially constant pressure gas supply to pilot light 14. The burner 12 may be turned ON and OFF by a thermostat (not shown) communicating with the desiccant within vessel 10 without interrupting or changing in any way the closed loop heat transfer system.

Thus, a system is provided which overcomes the problems and limitations of the prior art. The system is extremely simple yet effective and energy efficient since the gas utilized to provide the motive force for moving the heat transfer fluid in the closed system is not wasted but is used to operate the regenerator pilot light.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A system for heating a liquid in a separator comprising:

a separator vessel having a produced gas/liquid inlet and gas and liquid outlets and having a closed fluid flow loop within the separator in heat transfer relationship with the liquid in the separator;

a regenerator vessel having a wet desiccant inlet, a dry desiccant outlet, and a water vapor outlet;

a gas fired burner within said regenerator providing means to heat the desiccant therein, the burner having a pilot light and a gas inlet to the pilot light;

a closed fluid flow loop within said regenerator vessel in heat transfer relationship to the desiccant therein, the fluid flow loop in said regenerator vessel being in closed communication with said fluid flow loop in said separator vessel providing a closed heat transfer system between the liquid in said separator vessel and the desiccant in said regenerator vessel, the closed heat transfer system being filled with a heat transfer fluid;

a fluid flow eductor in series with said closed heat transfer system having a gas inlet and a gas outlet, the gas inlet being connected to a source of combustible gas under pressure and the gas outlet being connected to said gas fired burner pilot light, the flow of gas to said pilot light tending to cause circulation in said closed heat transfer system;

a thermostatic means for detecting the temperature of the liquid within said separator vessel; and a valve controlled by said thermostatic means in series with said closed heat transfer system, the valve opening in response to a preselected low temperature as detected by said thermostatic means to thereby allow fluid to flow in said closed heat transfer system and closing in response to a preselected high temperature as detected by said thermostatic means.

2. A system for heating liquid in a separator vessel according to claim 1 including:

a volume tank in said closed heat transfer system having a heat transfer fluid outlet in communication with said fluid flow eductor whereby heat transfer fluid is drawn into the volume tank by the flow of gas through said eductor when said thermostatically controlled valve is open, and a gas outlet opening therein; and means connecting said volume tank gas outlet to said pilot light.

3. A system according to claim 2 wherein said volume tank is at least partially received within said regenerator vessel.

4. A system according to claim 1 wherein said fluid flow eductor is in the form of an upright riser pipe having a heat transfer fluid inlet in the lower end and a fluid outlet at the upper end; and an orifice pipe of external diameter smaller than the internal diameter of said riser pipe and being received in the lower portion of said riser pipe, the orifice pipe having a lower inlet connected to said source of combustible gas under pressure, and the upper end being open to the interior of said riser pipe whereby gas flowing through the orifice pipe bubbles upwardly in heat transfer fluid within said riser pipe providing a pumping action.

5. A system according to claim 2 wherein said volume tank is upright and wherein the level of heat transfer fluid therein is intermediate the top and bottom thereof, and including:

a mist extractor in the upper portion of said volume tank above the liquid level therein and the mist extractor being in series communication with said gas outlet.

6. A system for heating a liquid, such as liquid hydrocarbaons, water, or a mixture of the two, in a separator, comprising:

a separator vessel having means for the flow of fluid therein;

a regenerator vessel;

heat exchange means including a closed loop fluid flow path having heat exchange means in each of said vessels;

gas pressure operated pump means for pumping a heat exchange fluid through said closed loop fluid flow path;

gas burner means for said regenerator vessel;

a source of combustible gas under pressure;

first gas delivery means operatively connecting said source of combustible gas to said pump means;

a gas burner for heating said regenerator vessel and having a pilot light;

second gas delivery means for supplying gas from said pressure operated pump means to said pilot light;

a controllable valve in said heat exchange means closed loop fluid flow path;

a temperature sensing means in said separator vessel adapted to sense the temperature of liquid in said separator vessel; and means to control said valve in response to said temperature sensing means.

7. A system according to claim 6 wherein said gas operated pump means comprises an eductor pump.

8. A system for heating liquid in a separator vessel according to claim 6 including:

a volume tank in said closed heat transfer system having a heat transfer fluid outlet and communication with said fluid flow eductor whereby heat transfer fluid is drawn into the volume tank by the flow of gas through said eductor when said thermostatically controlled valve is open, and a gas outlet opening therein; and means connecting said volume tank gas outlet to said pilot light.

9. A system according to claim 8 wherein said volume tank is at least partially received within said regenerator vessel.

10. A system according to claim 6 wherein said fluid flow eductor is in the form of an upright riser pipe having a heat transfer fluid inlet in the lower end and a fluid outlet at the upper end; and an orifice pipe of external diameter smaller than the internal diameter of said riser pipe and being received in the lower portion of said riser pipe, the orifice pipe having a lower inlet connected to said source of combustible gas under pressure, and the upper end being open to the interior of said riser pipe whereby gas flowing through the orifice pipe bubbles upwardly in heat transfer fluid within said riser pipe providing a pumping action.

11. A system according to claim 8 wherein said volume tank is upright and wherein the level of heat transfer fluid therein is intermediate the top and bottom thereof, and including:

a mist extractor in the upper portion of said volume tank above the liquid level therein and the mist extractor being in series communication with said gas outlet.

12. A method of treating a fluid in a separator vessel having a gas outlet, the method comprising:

providing a heated regenerator vessel and a closed heat transfer fluid loop flow path including heat exchange portions disposed within said separator vessel and heated regenerator vessel;

pumping a heat transfer fluid through said flow path responsive to demand for heating liquid in said separator vessel through the utilization of a gas pressure eductor pump serially connected into said flow path;

separating the eductor pump gas discharge from the heat transfer fluid within said flow path;

communicating said gas discharge to operate a pilot light portion of a burner means for heating said regenerator vessel;

sensing the temperature of said liquid in said separator vessel; and controlling the flow of heat transfer fluid through said flow path in response to the sensed temperature of said liquid in said separator vessel.

13. The method of claim 12 in which the rate of flow of gas for pumping a heat transfer fluid remains substantially constant.

* * * * *